April 8, 1958  C. W. KELL ET AL  2,829,605
RAILWAY VEHICLE TRUCK STRUCTURE
Filed Sept. 29, 1954  2 Sheets-Sheet 1

INVENTORS
CLEMENT W. KELL
JOHN K. ERZER
BASIL S. CAIN, DECEASED
BY THE FIRST NATIONAL BANK OF
ERIE, PENNSYLVANIA, EXECUTOR

By Rodney Bedell
atty.

April 8, 1958   C. W. KELL ET AL   2,829,605
RAILWAY VEHICLE TRUCK STRUCTURE

Filed Sept. 29, 1954   2 Sheets-Sheet 2

INVENTORS
CLEMENT W. KELL,
JOHN K. ERZER
BASIL S. CAIN, DECEASED
BY THE FIRST NATIONAL BANK OF
ERIE PENNSYLVANIA, EXECUTOR

By Rodney Bedell
Atty.

United States Patent Office 2,829,605
Patented Apr. 8, 1958

2,829,605

RAILWAY VEHICLE TRUCK STRUCTURE

Clement W. Keil, Ridley Park, and John K. Erzer, Erie, Pa., and Basil S. Cain, deceased, late of Erie, Pa., by The First National Bank, executor, Erie, Pa. assignors to General Steel Castings Corporation, Granite City, Ill., a corporation of Delaware, and General Electric Company, Schenectady, N. Y., a corporation of New York Application September 29, 1954, Serial No. 459,134

6 Claims. (Cl. 105—185)

The invention relates to railway rolling stock, and more particularly to railway trucks adapted for use in locomotives where it is desirable to provide three or more trucks under a rigid body structure. When such locomotives are on curved track, provision must be made to allow for a difference in relative lateral movements of the individual trucks in relation to the locomotive body without increasing or decreasing the load on one truck as compared to the load on another truck.

A principal object of the invention is to provide a truck for locomotives having three or more trucks under a single rigid superstructure body whereby the truck bolster is movable laterally of the truck without changing the vertical relationship of the truck frame relative to the locomotive body. This object is attained without complicating the understructure of the locomotive body by having the bolster held against longitudinal movement relative to the truck frame but providing coil springs between the frame and bolster for resisting lateral movements of the bolster, and by providing laterally spaced load bearings and a simple non-load bearing swiveling connection between the bolster and the body. If desired, however, the coil springs between the frame and bolster for resisting lateral movements of the bolster can be omitted for the intermediate trucks of a locomotive of this type.

A specific object is to restrain the truck bolster against movement longitudinally of the truck near the points of its support and of the application of the load thereto.

Another object of this invention is to provide a railway truck which shall be simple and effective in operation and which may be economically manufactured and installed.

These and other detail objects, as will appear from the following description, are attained by the structure illustrated in the accompanying drawings, in which.

Figure 1:
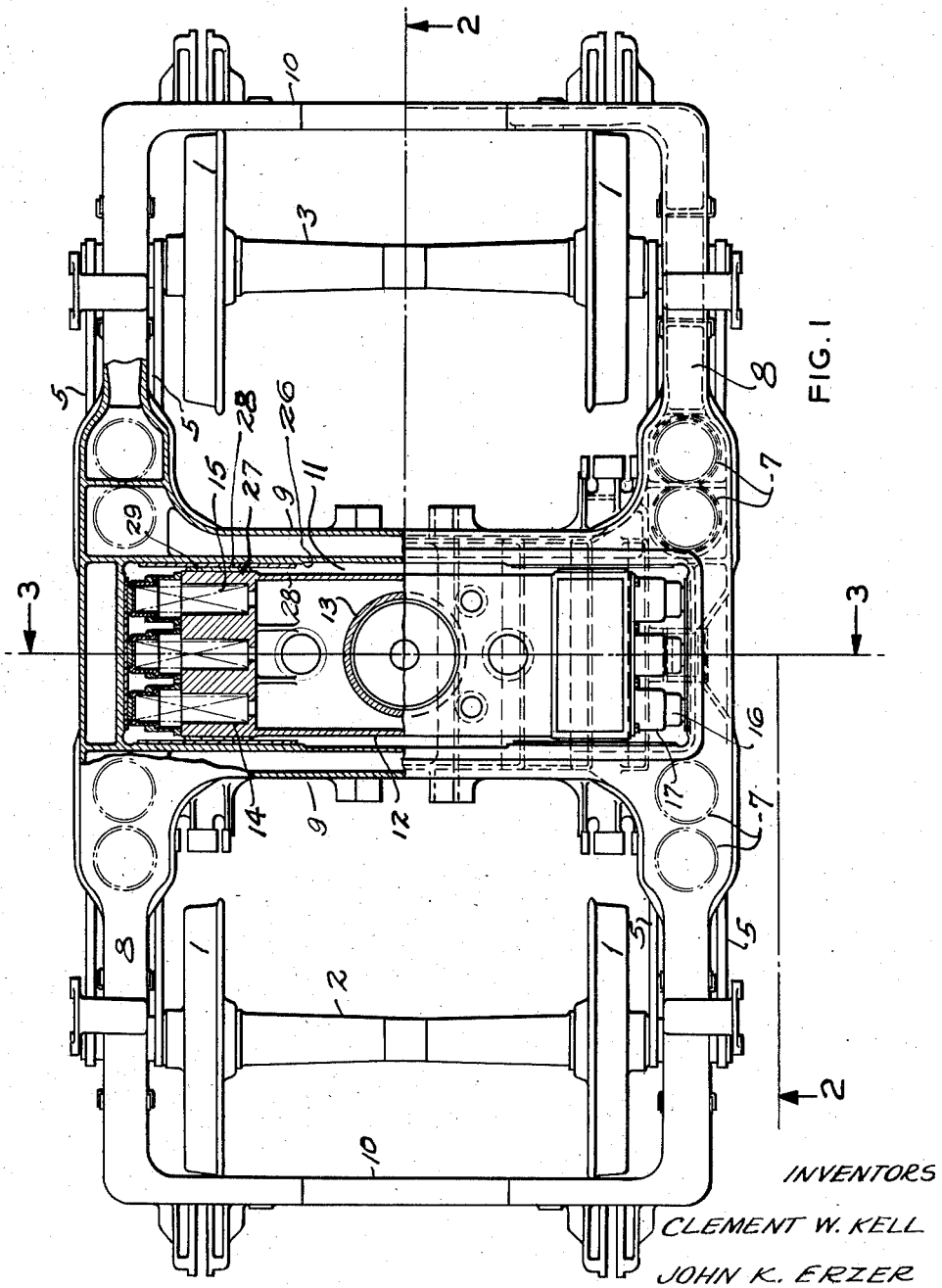
Figure 1 is a top view of a four-wheel truck embodying the present invention, portions being broken away and parts sectioned on the line 1—1 of Figure 3 to more clearly illustrate essential features of the construction.
Figure 2:
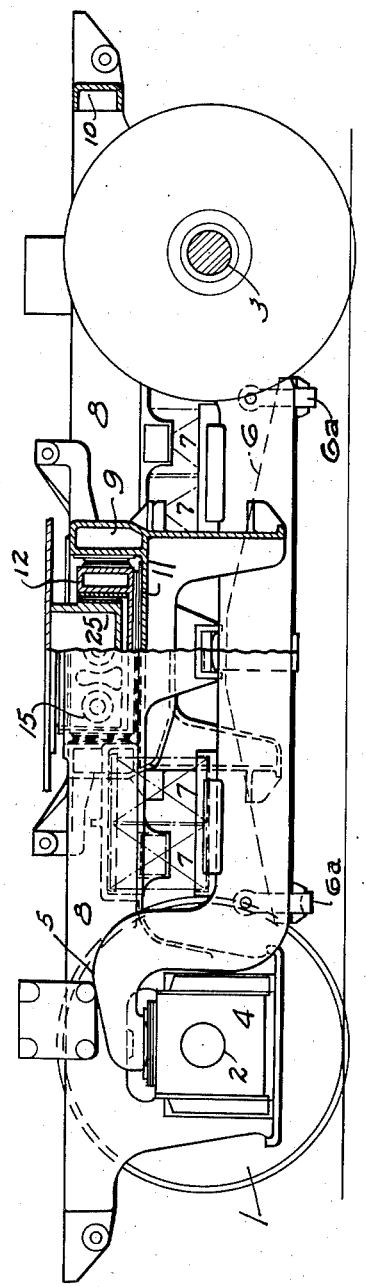
Figure 2 is a longitudinal vertical section and side elevation of the same structure and is taken on the line 2—2 of Figure 1.
Figure 3:
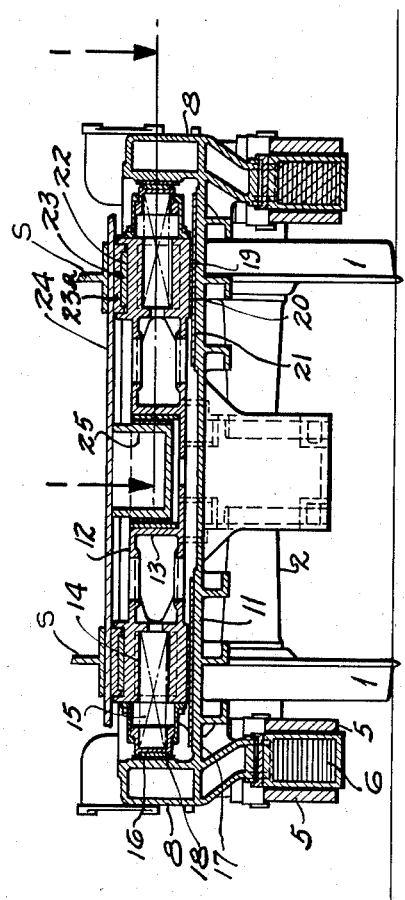
Figure 3 is a transverse vertical section taken on the line 3—3 of Figure 1.

The truck includes wheels 1, axles 2, 3, having journal boxes 4 which support equalizers 5, comprising a pair of spaced bars at each side of the truck and extending from journal box to journal box. The intermediate portion of each equalizer is offset downwardly and leaf springs 6, extending lengthwise of the trucks between the lower portions of the equalizer bars, are supported therefrom by links 6a. The equalizers also mount on their upper surface two pairs of longitudinally spaced upright helical springs 7. The truck frame includes wheel pieces 8, preferably of box section, which rest upon springs 6 and 7, and are connected by a pair of spaced, integral transverse center transoms 9 and end transoms 10. Equalizers 5 and wheel pieces 8 are positioned at the sides of the truck and laterally beyond or outboard of wheels 1.

Center transoms 9 are at the same level as wheel pieces 8 and are connected at their lower ends by a web 11 extending from side to side of the truck and forming in conjunction with transoms 9 and wheel pieces 8 a generally rectangular recess receiving a load-carrying bolster 12 supported solely at its ends on a flat horizontal stationary bearing on web 11 and having a central vertical cylindrical web 13 forming the truck part of a body and truck swivel connection. At each of its ends bolster 12 is provided with three laterally outwardly-opening pockets 14 housing springs 15 which project beyond the ends of the bolster proper with their outer ends seating thrust members 16 slidable in cap 17 bolted to bolster 12. Members 16 bear against wear pads 18 on the inner face of wheel pieces 8. Springs 15, and members 16, in cooperation with caps 17 permit lateral motion of bolster 12 relative to the truck frame and form a bolster centering device.

This type of truck may be used in any position in a locomotive having three or more trucks, and when only three trucks are used, the two end trucks may include a spring centering device as described above and centering devices may be omitted from the intermediate truck, as the end trucks would provide sufficient centering of the locomotive body in relation to the trucks. If the locomotive has four or more trucks of this type, the two end trucks may have a spring controlled bolster centering device and the bolster spring centering devices may be omitted from the intermediate trucks. If desired, however, two of the intermediate trucks could be provided with bolster spring centering devices and the bolster spring centering devices omitted from the other trucks.

Formed on the under surface of bolster 12 on opposite sides of center pivot 13 and spaced laterally from the longitudinal centerline of the truck are bosses 19 mounting wear plates 20 which are slidably supported on wear plates 21 carried on web 11 and transmitting the bolster load to the truck frame.

On its upper surface, in vertical alignment with bosses 19, bolster 12 has loading surface 22 mounting a separate resilient pad 23 and a separate wear plate 23a on pads 23. A locomotive underframe comprising the usual laterally spaced longitudinally extending main sills S and bottom cover plate 24 rests on bolster wear plates 23a, with the sills S in vertical alignment with wear plates 23a. The body load, which is supported solely by sills S, is thus always transmitted directly from sills S to bolster 12 at points spaced the same distance laterally from center pivot 13 as the main sills, regardless of lateral displacement of the truck relative to the body due to curved track. The bolster load is always transmitted to the truck frame at points on or equidistant from the transverse center line of the truck and equidistant from springs 7 and the wheeled axles and directly below the points of application of the body load to the bolster, regardless of swiveling movements of the truck.

Depending centrally from the car underframe plate 24 is a cylindrical projection 25 rotatably fitting within cylindrical web 13 to provide a swivel connection between truck bolster 12 and the car body. The bottom of body member 25 is spaced above the opposing face of the truck bolster and hence does not transmit any portion of the body load to the truck bolster and frame.

The car body and bolster 12 may shift laterally as a unit with respect to the truck frame, as when the car enters a track curve. Springs 15 will first distort and then return bolster 12 to centered position. Transverse center transoms 9 and the bolster have opposing bosses 26 and 27, respectively, provided with wear plates 28, 29, respectively. These elements guide the bolster 12 during its lateral movement relative to the truck frame and also prevent any longitudinal displacement of bolster 12.

Other centering structure may be substituted for springs 15 without adversely affecting the principles of load support and lateral motion. With this structure the truck is readily removable from the vehicle underframe and the centering device is readily accessible for inspection and repair. The moving parts are all on the bolster unit and it is unnecessary to attach any adjustable or removable parts to the underside of the vehicle underframe.

The details of construction may be varied substantially without departing from the spirit of the invention and the exclusive use of those modifications coming within the scope of the claims is contemplated.

What is claimed is:

1. In a railway vehicle, a truck frame having supporting elements at the opposite sides thereof, a bolster supported solely at its end portions by said elements and having upwardly facing bearings directly above said elements, the intermediate part of the bolster between said bearings forming an upright cylindrical member having a vertical axis, a vehicle body including laterally spaced longitudinally extending main sills directy above and supported solely on said bolster bearings, said body including a central cylindrical member fitting said bolster cylindrical member to form a pivotal connection between the body and bolster and holding them against relative movement longitudinally and transversely of the truck whereby said main sills and said bolster bearings are maintained in vertical alignment, said bolster and body being movable as a unit transversely of said truck frame, coil springs at each side of said cylindrical members with their axes disposed transversely of the truck, said springs being seated between opposing elements on the truck frame and bolster, said springs being compressible by movements of the bolster and body, as a unit, laterally of the truck from a normal centered position.

2. In a railway vehicle, a truck frame having flat horizontal supporting elements at the opposite sides thereof, a bolster slidably supported directly and solely by said elements and having upwardly facing bearings above said elements, the intermediate part of the bolster between said bearings forming a cylindrical member having a vertical axis, a vehicle body including a pair of laterally spaced longitudinally extending main sills directly above and supported solely on said bolster bearings, said body including a central cylindrical member fitting said bolster cylindrical member to form a pivotal connection between the body and bolster and holding them against relative movement longitudinally and transversely of the body, whereby said main sills and said bolster bearings are constantly retained in vertical alignment, said bolster and body being movable as a unit transversely of said truck frame.

3. In a railway vehicle, a truck and a vehicle body, the truck including a frame having upwardly facing flat supporting elements at the sides of the truck extending horizontally, a bolster supported solely by the sliding of its end portions on said elements and having upwardly facing bearings above said elements, the intermediate part of the bolster between said bearings including a cylindrical member having a vertical axis, the vehicle body including laterally spaced, longitudinally extending main sills supported on said bolster bearings, said body including a central cylindrical member fitting said bolster cylindrical member to form a pivotal connection between the body and bolster and holding them against relative movement longitudinally and transversely of the vehicle whereby said main sills and said bolster bearings are constantly maintained in vertical alignment, said bolster and vehicle body being movable as a unit transversely of the truck frame, by the sliding of the bolster on said truck frame elements, coil springs elongated transversely of the truck and positioned between the sides of the truck frame and opposing portions of the bolster, said springs being distortable by movements of the bolster and body laterally of the truck from a normally centered position.

4. In a railway vehicle, a truck comprising spaced wheeled axles, equalizers extending between said axles at the sides of the truck, a truck frame spring-supported from said equalizers and including wheel pieces and a pair of center transoms spaced apart lengthwise of the truck, said wheel pieces and transoms forming an upwardly open recess in the truck frame, a truck bolster extending transversely of the truck and substantially shorter than said recess and received therein, springs compressed between the ends of the bolster and the ends of said recess and yielding to movement of the bolster transversely of the frame, upwardly facing bearings on the end portions of the bolster, and a vehicle body comprising main longitudinal sills positioned over said bearings, and an upright cylindrical centering member on said bolster projecting upwardly from the bolster and interengaged with the vehicle body and holding it centered between said bearings while accommodating movement of said bolster and vehicle body as a unit transversely of the truck when the vehicle is on curved track.

5. In a railway vehicle, a truck comprising spaced wheel and axle assemblies, equalizers extending between said assemblies at each side of the truck, spring units carried by said equalizers and spaced apart longitudinally of the truck, a truck frame resting on said units, flat horizontal supporting elements on the opposite sides of said truck frame, a bolster supported at its ends solely by said elements and having upwardly facing bearings directly above said elements, the intermediate part of the bolster between said bearings forming a cylindrical member having a vertical axis, a vehicle body including a pair of laterally spaced longitudinally extending main sills, said vehicle body being supported solely on said bolster bearings through said main sills and directly above said bolster bearings, said body including a central cylindrical member fitting said bolster cylindrical member to form a pivotal connection between the body and bolster and holding them against relative movement longitudinally and transversely of the body, whereby said main sills and bolster bearings are constantly retained in vertical alignment, said bolster being movable solely transversely of said truck frame whereby the application of the bolster load to the truck frame is always symmetrical about the transverse center line of the truck regardless of swiveling movements of the truck.

6. In a railway truck, spaced wheeled axles, equalizers extending between said axles at the sides of the truck, springs on each equalizer spaced apart lengthwise of the truck and equidistant from the transverse center line of the truck, a truck frame supported on said springs and including wheel pieces and spaced center transoms equidistant from the transverse center line of the truck, said wheel pieces and transoms forming an upwardly opening recess in the truck frame, flat horizontal supporting elements carried by the frame within said recess, a bolster received in said recess, mounted at its end portions on said elements and movable transversely of the frame within said recess, bearings on top of said bolster end portions for supporting a vehicle body, an upright cylindrical member at the center of the bolster providing for a swivel connection between the truck and vehicle body thereon, and opposing elements on the sides of the bolster end portions and the transoms respectively holding the ends of the bolster against movement lengthwise of the truck frame, whereby transverse thrusts of the body are applied along the transverse center line of the truck and the vehicle vertical load is applied symmetrically about the transverse center line of the truck irrespective of the movement of the vehicle over curved track.

References Cited in the file of this patent

UNITED STATES PATENTS

| | | |
|---|---|---|
| 1,290,305 | O'Connor | Jan. 7, 1919 |
| 1,907,384 | Drenning | May 2, 1933 |
| 1,929,717 | Symington | Oct. 10, 1933 |
| 2,558,069 | Alben | June 26, 1951 |
| 2,610,586 | Alben | Sept. 16, 1952 |
| 2,650,549 | Cain et al. | Sept. 1, 1953 |